(12) United States Patent
Cramer et al.

(10) Patent No.: US 8,442,973 B2
(45) Date of Patent: *May 14, 2013

(54) REAL TIME IMPLICIT USER MODELING FOR PERSONALIZED SEARCH

(75) Inventors: Mark Cramer, San Francisco, CA (US); ChengXiang Zhai, Champaign, IL (US); Xuehua Shen, Urbana, IL (US); Bin Tan, Champaign, IL (US)

(73) Assignees: Surf Canyon, Inc., Oakland, CA (US); The Board of Trustees of The University of Illinois, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,076

(22) Filed: May 1, 2007

(65) Prior Publication Data

US 2008/0114751 A1 May 15, 2008

Related U.S. Application Data

(60) Provisional application No. 60/796,624, filed on May 2, 2006.

(51) Int. Cl.
*G06F 7/00* (2006.01)
*G06F 17/00* (2006.01)

(52) U.S. Cl.
USPC .......................................... 707/723; 707/753

(58) Field of Classification Search ........................ None
See application file for complete search history.

(56) References Cited

U.S. PATENT DOCUMENTS

| | | | |
|---|---|---|---|
| 5,806,077 A | 9/1998 | Wecker | |
| 5,890,152 A * | 3/1999 | Rapaport et al. | 1/1 |
| 5,946,678 A * | 8/1999 | Aalbersberg | 1/1 |
| 6,134,532 A | 10/2000 | Lazarus et al. | |
| 6,370,526 B1 | 4/2002 | Agrawal et al. | |
| 6,591,261 B1 | 7/2003 | Arthurs | |
| 6,738,764 B2 | 5/2004 | Mao et al. | |
| 6,829,599 B2 | 12/2004 | Chidlovskii | |
| 6,981,040 B1 * | 12/2005 | Konig et al. | 709/224 |
| 6,991,106 B2 * | 1/2006 | Milliorn | 206/409 |
| 7,437,370 B1 | 10/2008 | Ershov | |

(Continued)

OTHER PUBLICATIONS

Agichtein et al.; "Improving Web Search Ranking by Incorporating User Behavior Information"; 2006, *ACM*, 8 pages.

(Continued)

*Primary Examiner* — Usmaan Saeed
*Assistant Examiner* — Yu Zhao
(74) *Attorney, Agent, or Firm* — Kilpatrick Townsend & Stockton LLP

(57) ABSTRACT

A method and apparatus for utilizing user behavior to immediately modify sets of search results so that the most relevant documents are moved to the top. In one embodiment of the invention, behavior data, which can come from virtually any activity, is used to infer the user's intent. The updated inferred implicit user model is then exploited immediately by re-ranking the set of matched documents to best reflect the information need of the user. The system updates the user model and immediately re-ranks documents at every opportunity in order to constantly provide the most optimal results. In another embodiment, the system determines, based on the similarity of results sets, if the current query belongs in the same information session as one or more previous queries. If so, the current query is expanded with additional keywords in order to improve the targeting of the results.

24 Claims, 8 Drawing Sheets

Flowchart of one embodiment of the invention

U.S. PATENT DOCUMENTS

| | | | |
|---|---|---|---|
| 7,444,327 B2* | 10/2008 | Watson et al. ............... 707/5 |
| 7,475,072 B1 | 1/2009 | Ershov |
| 7,496,548 B1 | 2/2009 | Ershov |
| 7,599,918 B2 | 10/2009 | Shen et al. |
| 2002/0107776 A1 | 8/2002 | Bove et al. |
| 2003/0014399 A1* | 1/2003 | Hansen et al. ............... 707/3 |
| 2003/0088463 A1 | 5/2003 | Kanevsky et al. |
| 2003/0135490 A1* | 7/2003 | Barrett et al. ............... 707/3 |
| 2003/0144994 A1* | 7/2003 | Wen et al. ............... 707/3 |
| 2003/0195877 A1* | 10/2003 | Ford et al. ............... 707/3 |
| 2004/0111678 A1* | 6/2004 | Hara et al. ............... 715/526 |
| 2005/0060311 A1* | 3/2005 | Tong et al. ............... 707/7 |
| 2005/0071328 A1* | 3/2005 | Lawrence ............... 707/3 |
| 2005/0102282 A1* | 5/2005 | Linden ............... 707/3 |
| 2005/0165781 A1* | 7/2005 | Kraft et al. ............... 707/7 |
| 2005/0192863 A1* | 9/2005 | Mohan ............... 705/14 |
| 2005/0234952 A1* | 10/2005 | Zeng et al. ............... 707/101 |
| 2006/0064411 A1* | 3/2006 | Gross et al. ............... 707/3 |
| 2006/0136589 A1 | 6/2006 | Konig et al. |
| 2007/0022111 A1* | 1/2007 | Salam et al. ............... 707/5 |
| 2007/0061487 A1 | 3/2007 | Moore et al. |
| 2008/0120289 A1 | 5/2008 | Golan et al. |
| 2008/0222142 A1 | 9/2008 | O'Donnell |
| 2008/0244428 A1 | 10/2008 | Fain |
| 2008/0250026 A1 | 10/2008 | Linden et al. |
| 2008/0295006 A1 | 11/2008 | LuVogt et al. |
| 2009/0164448 A1 | 6/2009 | Curtis |
| 2009/0276368 A1 | 11/2009 | Martin et al. |
| 2009/0282021 A1 | 11/2009 | Bennett |
| 2010/0169297 A1 | 7/2010 | Haveliwala et al. |

OTHER PUBLICATIONS

Agichtein et al.; "Learning User Interaction Models for Predicting Web Search Result Preferences"; 2006, *Microsoft Research*, 8 pages.

Claypool et al.; "Inferring User Interest"; 2001, *IEEE*, 8 pages.

Fox et al.; "Evaluating Implicit Measures to Improve Web Search"; 2005, *ACM*, 22 pages.

Goecks et al.; "Learning Users' Interests by Unobtrusively Observing Their Normal Behavior"; 1999, *University of Wisconsin*, 4 pages.

Joachims et al.; "Accurately Interpreting Clickthrough Data as Implicit Feedback"; 2005, *ACM*, 8 pages.

Shen, Xuehua et al.; "Implicit User Modeling for Personalized Search"; 2005, Department of Computer Science, University of Illinois at Urbana-Champaign, 8 pages.

* cited by examiner

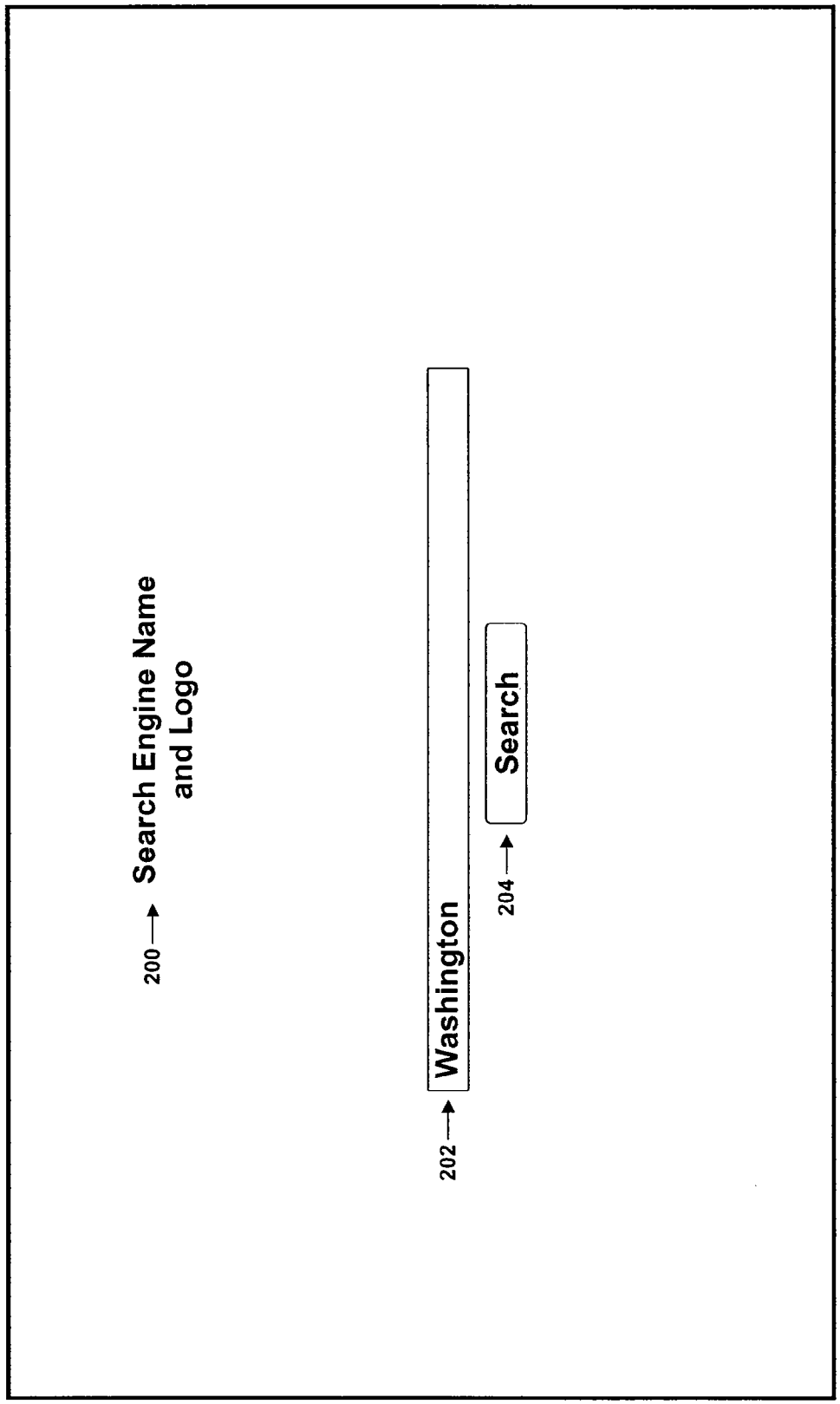

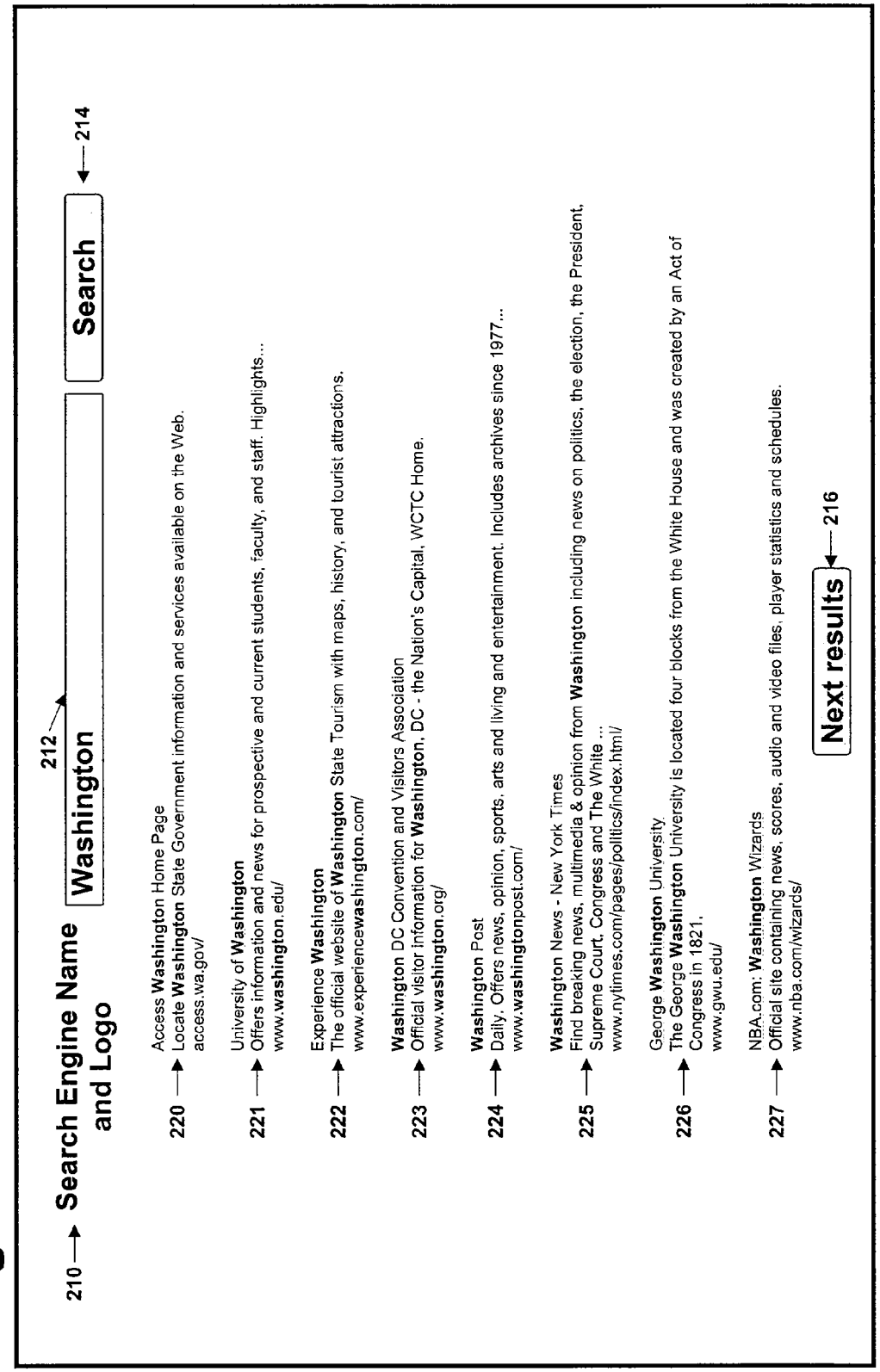

Diagram of one embodiment of the re-ranked search results

Diagram of one embodiment of the search results re-ranked again

Diagram of one embodiment of the search results employing query expansion

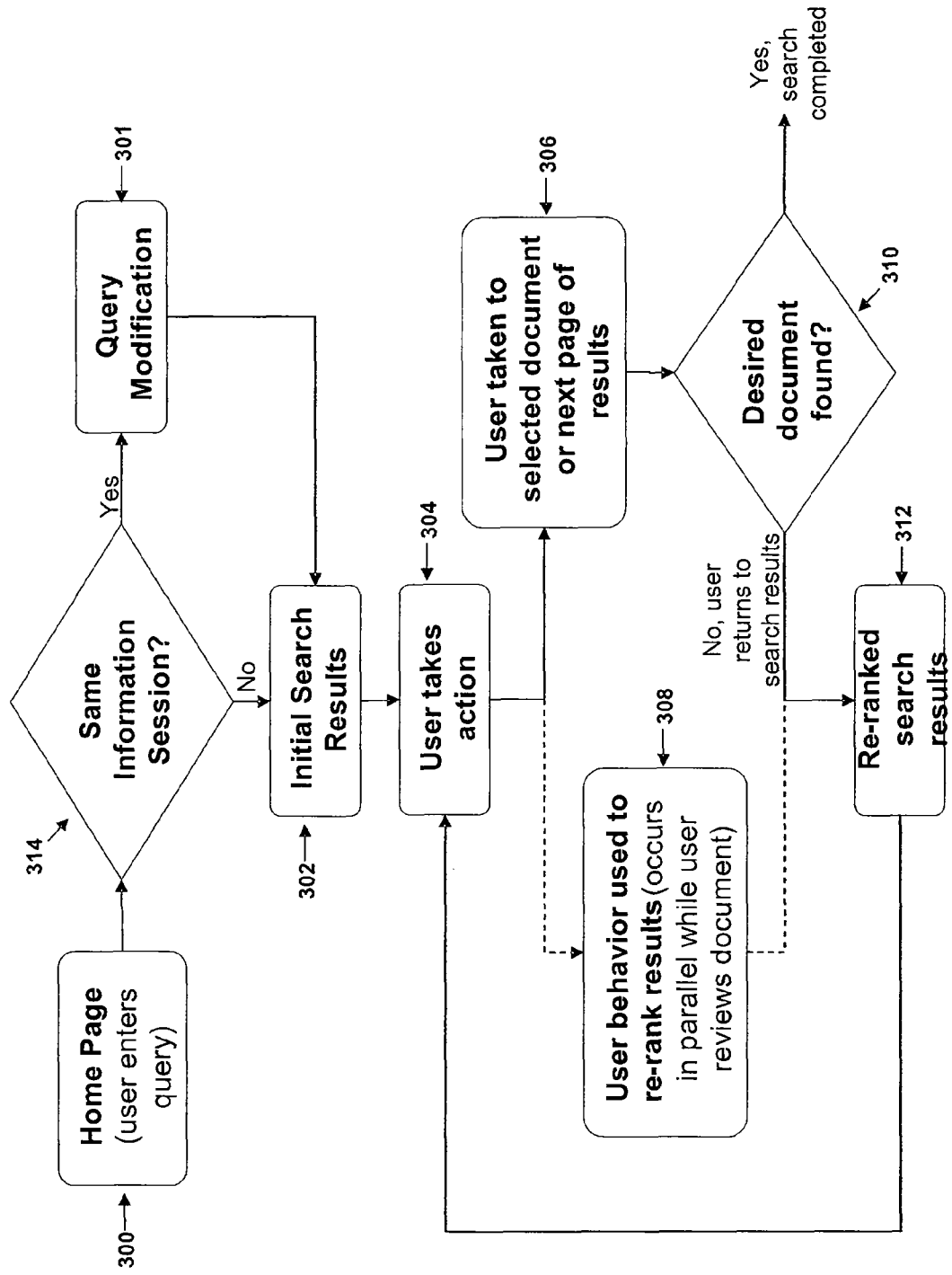
FIG. 3 Flowchart of one embodiment of the invention

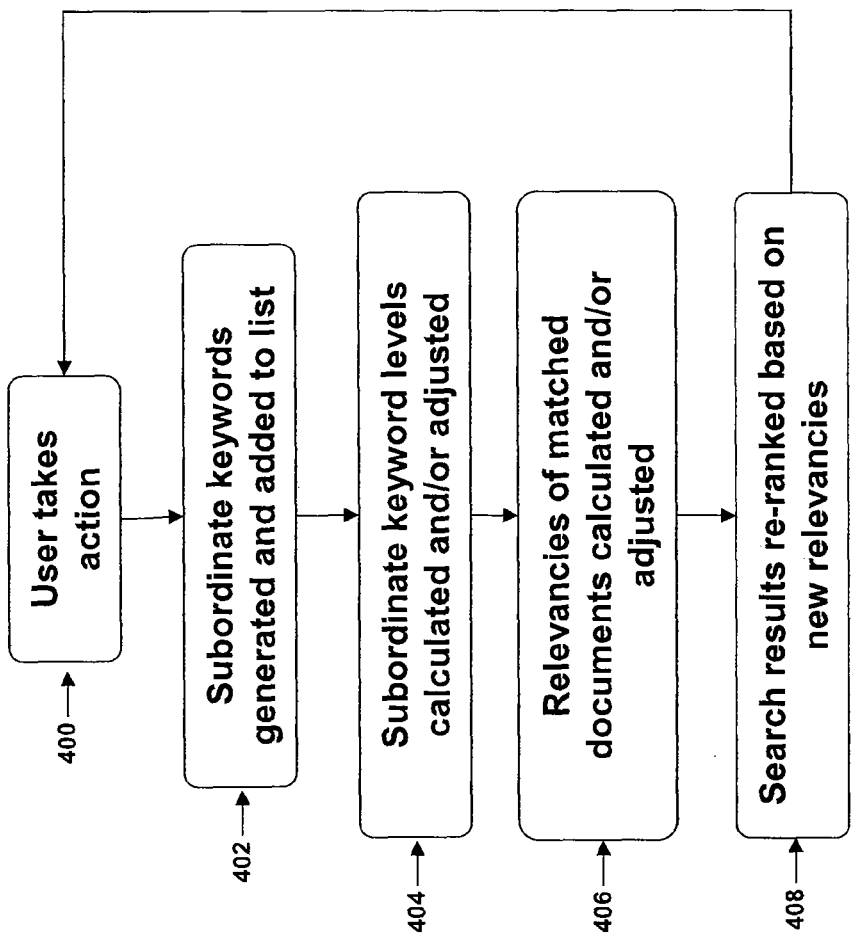
FIG. 4 Flowchart of one embodiment of subordinate keyword generation and re-ranking of results

REAL TIME IMPLICIT USER MODELING FOR PERSONALIZED SEARCH

CROSS-REFERENCES TO RELATED APPLICATIONS

This application claims the benefit of U.S. Provisional Patent Application No. 60/796,624, filed May 2, 2006, entitled "Dynamic Search Engine Results Using User Behavior", which is hereby incorporated by reference in its entirety.

This invention was made with Government support under Contract Number IIS-0347933 and IIS0428472 awarded by the National Science Foundation (NSF). The Government has certain rights in the invention.

BACKGROUND OF THE INVENTION

The present invention relates to search engines which monitor user behavior in order to generate results with improved relevance.

Search engines are designed to explore data communication networks for documents of interest to a given user and then generate listings of results based on those documents identified in that search. The user specifies this interest by inputting a query, expressed as a "keyword" or set of "keywords," into the search engine. The keywords are then compared with terms from documents previously indexed by the search engine in order to produce a set of matched documents. Finally, before being presented, the matched documents are ranked by employing any number of different algorithms designed to determine the order with which documents might be relevant to the user. Those documents with the highest probability of being relevant to the user are typically presented first. The objective is to quickly point the user toward documents with the greatest likelihood of producing satisfaction.

On the internet (a popular, global data communication network), due predominantly to improvements in technology and the growth in the quantity of information available, the number of indexed documents has grown rapidly; some queries now return millions of matched documents. As a result, the ability of internet search engines to help users identify documents of particular interest to a given query is hampered. In other words, while internet users have access to an increasing quantity of potentially relevant information, identifying relevant documents by driving queries using only the keywords entered by users has become more difficult.

Many search engines have thus begun employing strategies in an attempt to combat this problem, beyond simply improving the algorithms that rank relevancy. Some of the major strategies consist of things such as focusing on specific vertical segments, using artificial intelligence to perform contextualized searches, leveraging psychographic, demographic and geographic information and mining the search behaviors of previous users. (Using the behavior of previous users to predict the relevancies of documents for future users has been covered by a number of U.S. patents and applications: 2006/0064411 A1 entitled "Search engine using user intent," U.S. Pat. No. 6,738,764 B2 entitled "Apparatus and method for adaptively ranking search results," and U.S. Pat. No. 6,370,526 B1 entitled "Self-adaptive method and system for providing a user-preferred ranking order of object sets," to name a few.) Additional strategies also include leveraging the previous search history of the particular user in order to customize future searches for that individual.

In spite of these new strategies, current retrieval systems continue to be far from optimal. A major deficiency of existing retrieval systems is that they generally lack user modeling and are not adaptive to individual users, and when they do they are not updated in real time. This inherent non-optimality is seen clearly in the following two cases: (1) Different users may use exactly the same query (e.g., "Java") to search for different information (e.g., the Java island in Indonesia or the Java programming language), but existing Information Retrieval (IR) systems return the same results for these users. Without considering the actual user, it is impossible to know which sense "Java" refers to in a query. (2) A user's information needs may change over time. The same user may use "Java" sometimes to mean the island in Indonesia and some other times to mean the programming language. Without recognizing the search context, it would be again impossible to recognize the correct sense and the user will inevitably be presented with a non-optimal set of search results.

Once presented with such non-optimal set of results, users' options are limited. They can scan page by page through a myriad of potentially irrelevant documents in an attempt to pick out the ones that matter, or they can modify their query by trying to identify additional or more specific keywords in an attempt to produce new, and hopefully more optimal, sets of results. Depending on the nature of the search and the ingenuity of the user, this task can often be painstaking and frustrating, if not impossible.

In order to optimize retrieval accuracy, there is clearly a need to model the user appropriately and personalize search according to each individual user. The major goal of user modeling for IR is to accurately model a user's information need, which is a very difficult task. Indeed, it is even hard for a user to precisely describe his or her information need.

There is therefore a need for search engine technology capable of implicitly modeling the information need of the specific user conducting a search, at the moment that search is being executed, in order to immediately modify the search results "on the fly" with the purpose of ranking the matched documents in the most relevant order possible for the user's query.

SUMMARY OF THE INVENTION

The present invention provides a system for employing the behavior of a specific user to immediately modify search results, "on the fly," while the search is being conducted. The search engine of the preferred embodiment compiles information with respect to the behavior of the user currently conducting a search in order to infer the intent and interests of that user, thereby enabling the search engine to present more optimal results by immediately altering, in real time, the relevancies, and thus order, of the matched documents. The system uses "eager feedback" to dynamically altering the search results as soon as new information regarding the user's intent is available, whether it's collected explicitly or implicitly.

In one embodiment, a software application runs as a user interface between a user and a standard third-party search engine or multiple third-party search engines with the user selecting the preferred. Since the initial results are pulled from the underlying engine they naturally take advantage of all of the technologies and strategies, such as the examples given above, which went into determining the relevancies and ordering of the matching documents in that initial list.

In a traditional retrieval paradigm, the retrieval problem is to match a query with documents and rank documents according to their relevance values. As a result, the retrieval process is a simple independent cycle of "query" and "result display." However, while keywords provide the most direct evidence of a user's information need, since query's are often extremely short, the user model constructed based on a keyword query is inevitably impoverished.

One method of expanding the user model is by explicitly asking the user to give feedback regarding his or her information need. In the real world applications, however, users are typically reluctant or unable to provide such feedback.

It is thus interesting to infer a user's information need based on implicit feedback information, which naturally exists through user interactions and thus does not require any additional effort on the part of the user. The system thus expands the model of the user's information need by collecting data regarding that user's behaviors.

In one embodiment, the system expands the user information need model by inferring the user's intent based on information gathered by virtue of clicking on documents during a search. In another embodiment, other aspects of the user's behavior, such as subsequent clicks on links within documents, time spent looking at different documents ("dwelling time"), time spent looking at domains associated with different documents, downloads, transactions, cursor movements, scrolling and highlighting of text, images or other information, are also monitored and used to infer and then model the intent and interests of the user.

In one embodiment, the inferred intent of the user is characterized in the user model by using subordinate keywords. Subordinate keywords, as opposed to traditional primary keywords, are keywords that are identified as important to the search, but are not necessarily essential for a matched document. They are automatically generated by the system from a variety of places, such as documents clicked on by the user during the search process as well as documents that are ignored or skipped by the user.

In one embodiment, the system uses the model of the user's intent to immediately re-rank the matched documents "on the fly" to continuously provide the user with the most optimal results possible. In another embodiment, the system identifies related queries in order to immediately expand the current query so as to better target the user's information need. In this new retrieval paradigm, the user's search context plays an important role and the inferred implicit user model is exploited immediately for the benefit of the user.

The outcome is a real time implicit personalization search engine that immediately exploits any new information regarding the user's intent by dynamically altering the search results and presenting the user with a more relevant set of documents. The system not only exploits all of the intelligence and technology built into the underlying search engine that went into generating the initial results, but is better equipped to help users find the documents they desire by assisting them in navigating increasingly ponderous lists of matched documents in search results. Web search performance is thus improved without any additional effort on the part of the user.

BRIEF DESCRIPTION OF THE DRAWINGS

FIG. 2A is a diagram of one embodiment of the home page.

FIG. 2B is a diagram of one embodiment of the initial search results.

FIG. 3 is a flowchart of one embodiment of the invention.

FIG. 4 is a flowchart of one embodiment of subordinate keyword generation and re-ranking of results.

DETAILED DESCRIPTION OF THE INVENTION

Figure 1:
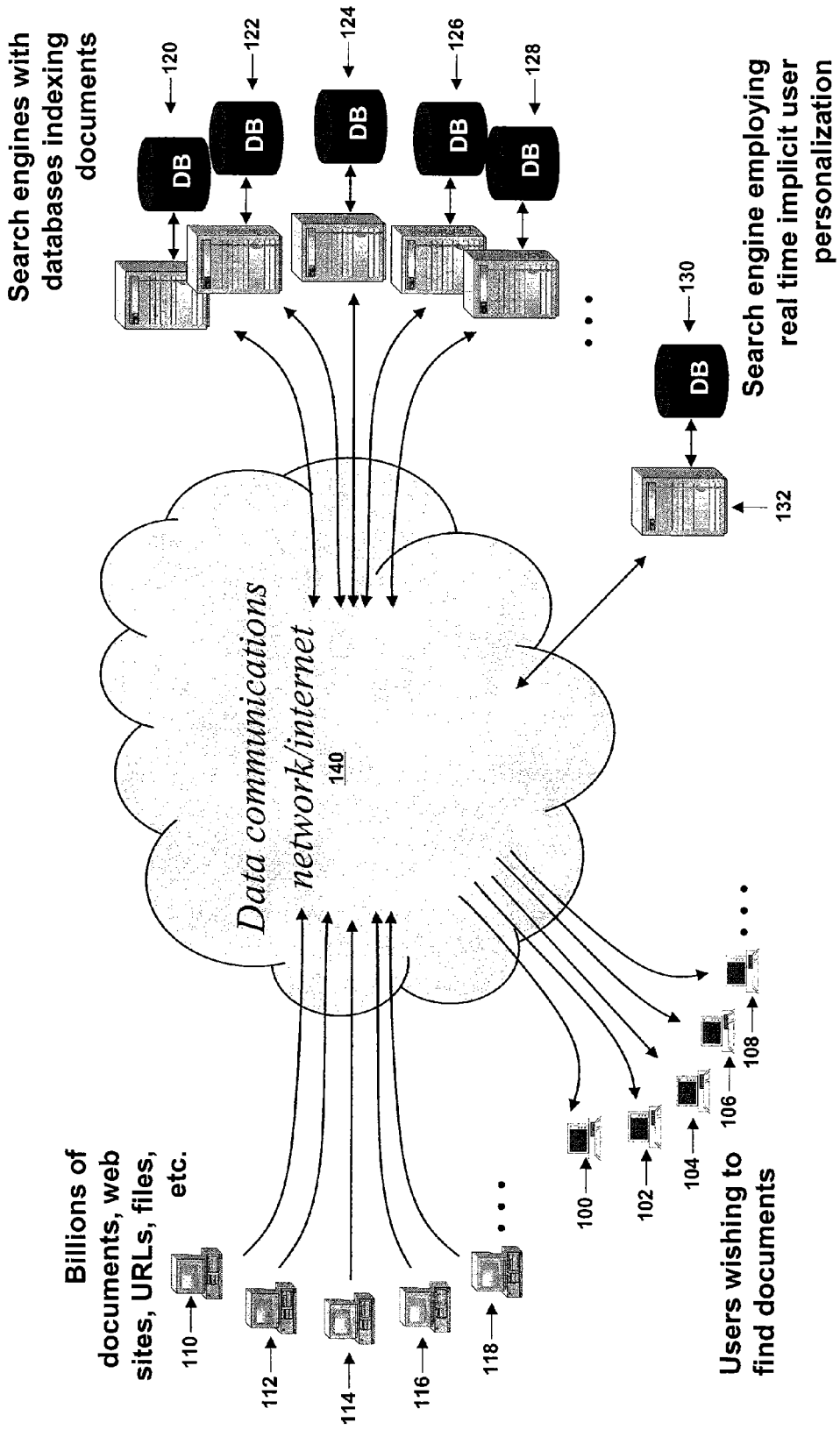
FIG. 1 is a diagram of one embodiment of a system incorporating the present invention.

The preferred embodiment of the present invention operates on the internet, and more specifically the World Wide Web. The present invention, however, is not limited to the internet, the World Wide Web or any other particular network architecture, software or hardware which may be described herein. The invention is appropriate for any other network architectures, hardware and software. Furthermore, while the following description relates to an embodiment utilizing the internet and related protocols, other networks and protocols, for example, for use with interactive TVs, cell phones, personal digital assistants and the like, can be used as well.

The functions described herein are performed by programs including executable code or instructions running on one or more general-purpose computers. The functions described herein, however, can also be implemented using special purpose computers, state machines and/or hardwired electronic circuits. The example processes described herein do not necessarily have to be performed in the described sequence and not all states have to be reached or performed. The programs are stored in memory as computer readable media.

As used herein, the term "website" refers to a collection of content. Website content is often transmitted to users via one or more servers that implement basic internet standards. "Website" is not intended to imply a single geographic or physical location but also includes multiple geographically distributed servers that are interconnected via one or more communications systems.

As used herein, the term "document" is defined broadly and includes any type of content, data or information contained in computer files and websites. Content stored by servers and/or transmitted via the communications networks and systems described herein may be stored as a single document, a collection of documents or even a portion of a document. The term "document" is not limited to computer files containing text but also includes files containing graphics, audio, video and other multimedia data. Documents and/or portions of documents may be stored on one or more servers.

As used herein, the term "click" or "click-through" is defined broadly and refers to clicking on a hyperlink included within search result listings to view an underlying document or website. The term "clicking on" a link or button, or pressing a key to provide a command or make a selection, may also refer to using other input techniques such as voice input, pen input, mousing or hovering over an input area or the like.

The real time implicit personalization search engine of the preferred embodiment utilizes "eager feedback" which entails compiling information with respect to the behavior of the user currently conducting a search in order to infer the interests and intent of that user in real time thereby enabling the search engine to present more pertinent results by immediately altering the relevancies, and thus order, of the matched documents. The categories of user behavior acquired may include search terms that resulted in click-throughs to particular webpages, websites and sub-domains visited, dwell time, and actions taken at the webpages including document downloads and financial transactions.

In principle, every action of the user can potentially provide new evidence to help the system better infer the user's information need. Thus in order to respond optimally, the system should use all the evidence collected so far about the user when choosing a response. When viewed in this way, most existing search engines are clearly non-optimal. For example, if a user has viewed some documents on the first page of search results, when the user clicks on the "Next results" link to fetch more results, an existing retrieval system would still return the next page of results retrieved based on the original query without considering the new evidence that a particular result has been viewed by the user.

FIG. 1 is a high-level illustration of a preferred embodiment of a system incorporating the present invention. Documents on servers or computers 110-118, on a data communication network 140, such as the internet, are scanned and indexed by search engines on computers and associated databases 120-128. On the internet there are currently billions of documents available, with more being added daily. Google, Yahoo!, MSN and Ask are examples of popular internet search engines, but most any web site that enables users to search documents on a data communications network and retrieve relevant results can be considered a search engine. Users on computers or terminals 100-108 seeking information can connect with the search engine of their choice, enter keywords related to their searches, and then retrieve lists of matched documents, normally sorted and ranked by an algorithm that places the ones with the highest probability of being relevant to the user's query at the top. An embodiment of the present invention provides a server 132 and database 130 which plug into the data communications network and then uses the behavior of current users to alter the results provided by one, if not several, of the other search engines.

The description of this system will focus on a website that takes results from other search engines that reside on the internet, however, another embodiment of the system would involve incorporating the present invention directly into one of the other search engines 120-128. Rather than collecting the initial search results via a data communications network, the system can gather the results directly from the search engine and then operate accordingly. This embodiment would offer some advantages in terms of modifying the rankings of the matched documents in that the system could use the actual relevancy scores of the matched documents, as calculated by the underlying search engine, as opposed to simply the rank, which is used as a proxy for relevancy. Another embodiment of the invention involves utilizing its own search engine, as opposed to that of a third-party, should one be available.

One embodiment of the system would involve software, which could be made available for download, which resides on the users' computers or terminals 100-108. Rather than going to the website of the invention, users will now go directly to their search engine of choice and the process of using user modeling to immediately alter search results will be performed by the software located on the users' computers. Client-side software offers a number of advantages, such as expanding the set of observable behaviors of the users and improving scalability.

Downloadable software will also enable increased privacy for the user. Many users may be troubled by having their behavior data reside on a server outside their control. By pushing the personalization software and the user model to the client's machine, all of the user behavior data as well as any inferences with respect to the user's intent will never be out of the possession of the user. The client's machine will then accept search results as they are produced by the underlying search engine with all of the re-ranking, using the implicit user model, conducted locally. In one embodiment of the system, all of the behavior data and the user model are stored on the client's machine, however, the weighting and re-ranking algorithms, to prevent reverse engineering, would remain on the server. The client's machine can then utilize the algorithms on the server by passing back and forth tables of data which would not, by themselves, be decipherable by the server.

FIG. 2A is a diagram of a home page of a preferred embodiment of the invention. While other information and links can be present, the principal purpose of the home page is to enable the user to enter a keyword or set of keywords 202 representing the user's query before clicking on a button 204 to request that the search engine retrieve the results.

FIG. 2B is a diagram of an example of a search results page depicting what the initial search results for the keyword "Washington" might look like. Upon receiving a query 212 from a user, expressed as a keyword or set of keywords, the invention pulls the results 220-227 from another search engine, using publicly available APIs, or some other method, such as, for example, screen scraping, before presenting them to the user. Each result is normally comprised of a title, snippet and the Uniform Resource Identifier (URL) of the document, the combination of which can be described as the summary. The set of matched documents, and the order in which they are presented, is typically identical to that of the underlying search engine. It is in this way that the present invention is able to exploit all of the technologies and strategies used by the underlying search engine when producing the initial search results.

Since the number of matched documents rarely fits on a single page, buttons, such as a next results button 216, are available to enable users to navigate to subsequent pages of results or back to previous pages of results. It should also be noted that there is nothing preventing an embodiment of the system from offering supplemental information on the search results page, as is often the case with search engines, such as related popular queries, suggested spellings or links to maps and stock quotes.

Figure 2C:
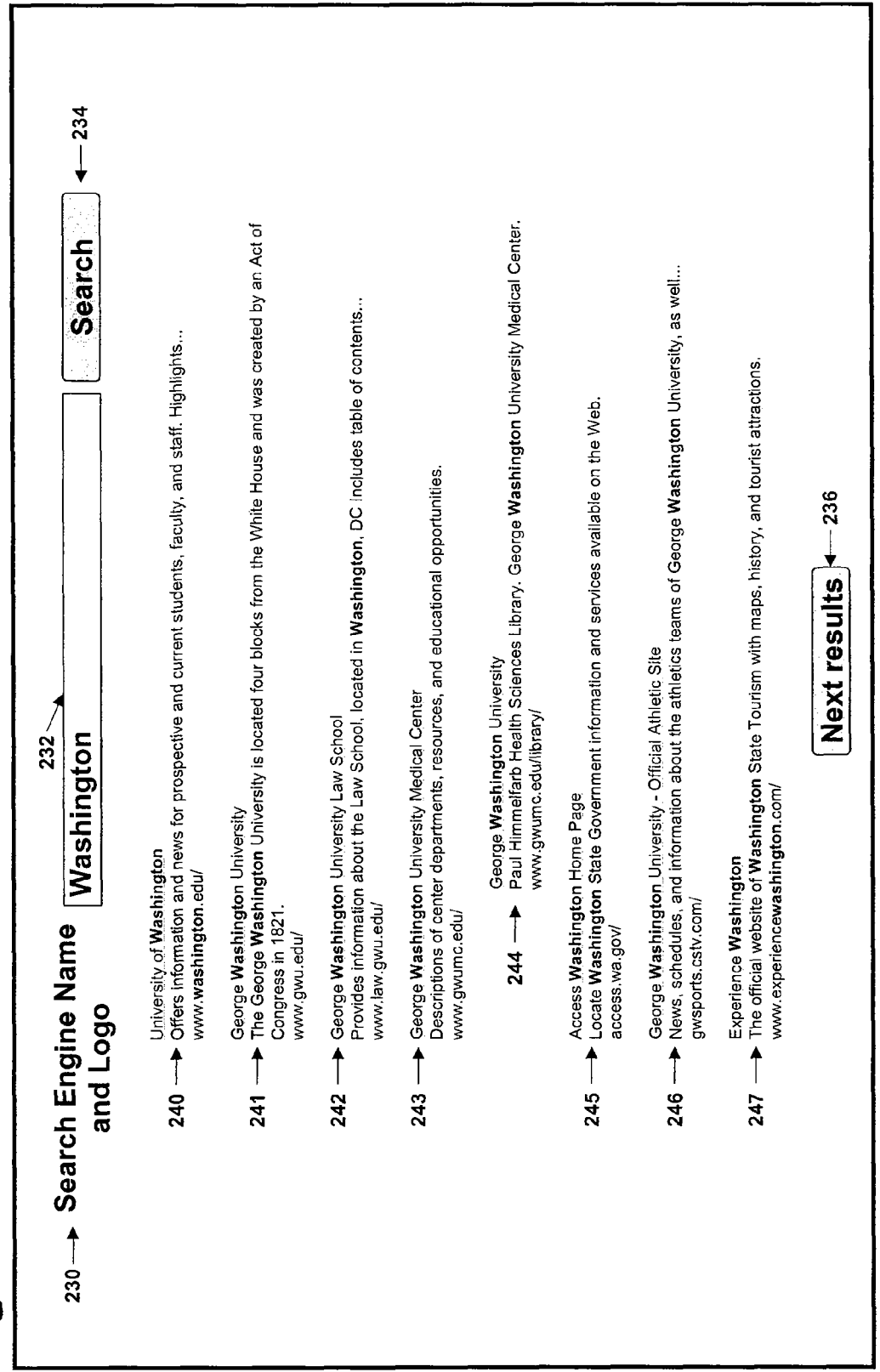
FIG. 2C is a diagram of one embodiment of the re-ranked search results.

FIG. 2C is a diagram of an example of how the first modified results might look after the user clicks on the document "George Washington University" 226 from the initial results as depicted in FIG. 2B and then, having not been completely satisfied by that document, returns to the search results page. The set of matched documents remains the same, yet their order has changed based on the intelligence gathered as a consequence of the user's click on the document "George Washington University" 226. The system has determined that the user is most likely interested in universities containing the word "Washington" as opposed to George Washington the man or Washington the city or state. As a result, the "Access Washington Home Page" document 220, which was initially at the top of the list, has fallen to the sixth position 245 because the system has deemed, based on the behavior of the user, that the probability of this document being relevant to the user has declined. On the other hand, the "University of Washington" document 221, which was initially in the second position, has now moved to the top 240 because the system has deemed, again based on the behavior of the user, that the relevance of this document has increased. This process continues, for all practical purposes, for every document returned in the set of search results.

Figure 2D:
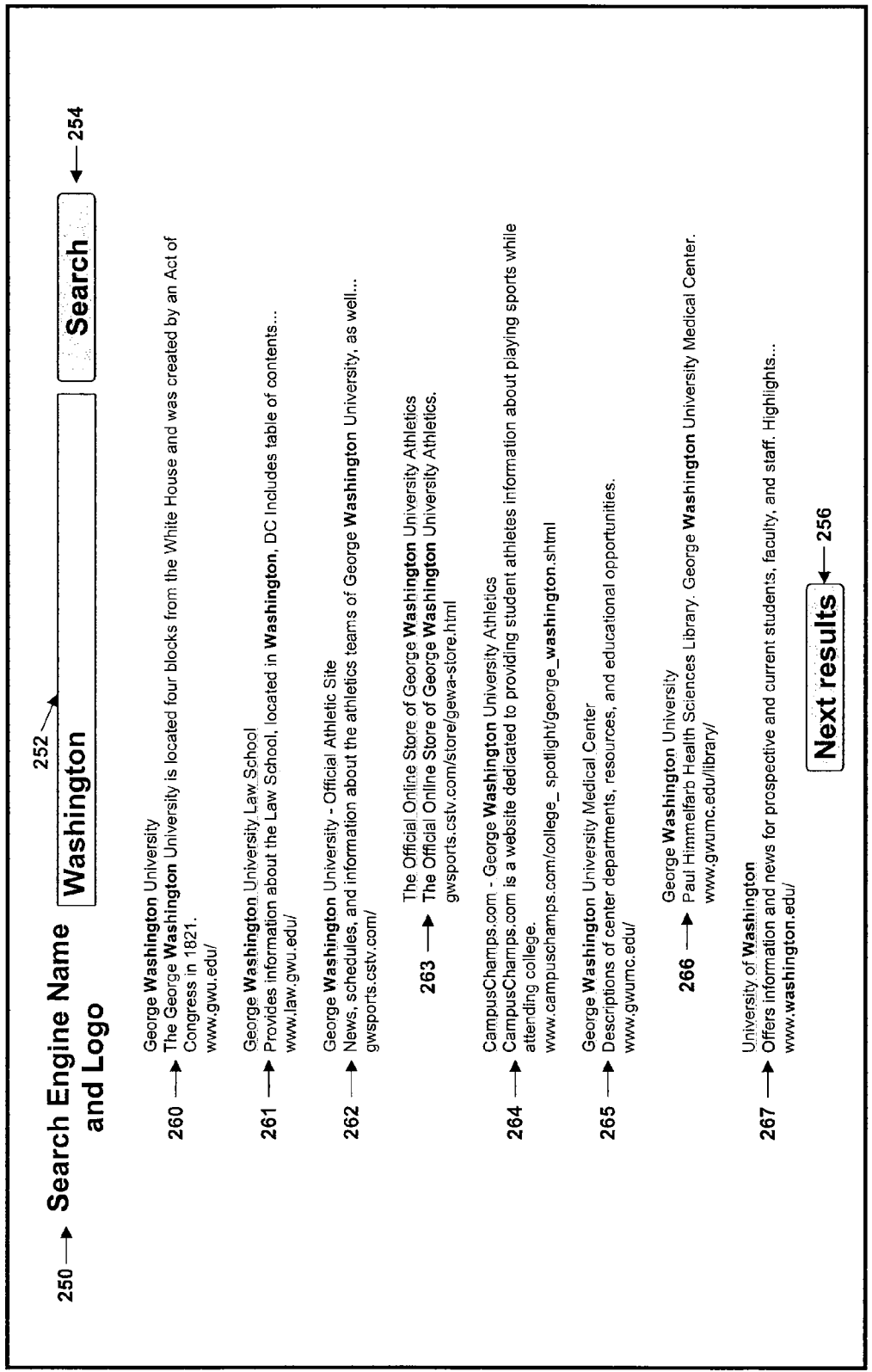
FIG. 2D is a diagram of one embodiment of the search results re-ranked again.

FIG. 2D is a diagram of an example of how the second modified results page might look after the user clicks on the document "George Washington University—Official Athletic Site" 246 in FIG. 2C and then returns again to the search results page. The order of the search results have once again changed based on this new intelligence gathered with respect to the behavior of the user. The system has determined that the user is perhaps most interested in athletics at George Washington University. Thus, the "University of Washington" document 267 has now moved to the eighth position after initially being in position two 221 in FIG. 2B and then being moved, subsequent to the user's first action, to position one 240 in FIG. 2C. While the system initially increased the relevance of this document after the first action, it was then decreased after the user's second action. The document "George Washington University" 260 has now moved to the top spot after initially being placed in the seventh position 226 in FIG. 2B and then promoted, subsequent to the user's first action, to the second position 241 in FIG. 2C. This process continues, for all practical purposes, for every document returned in the modified set of search results in FIG. 2C.

In another embodiment of the invention, instead of immediately re-ranking all of the results in the search set, the search engine will only re-rank the "unseen" results. These re-ranked results will then only become visible once the user navigates to a subsequent page of search results. In another embodiment of the invention, only unseen results are re-ranked, however, after each re-ranking a certain number of the top unseen results is moved forward as "recommendations." These recommendations are displayed on the current page of search results and are then, for purposes of future re-ranking, considered "seen." The technology for modeling user behavior and then using that to alter the relevancies of the documents in the results set is the same; however, the visualization is modified to ease the obtrusiveness on the user experience.

In one embodiment of the system, the user's information need is modeled through the term vector $\bar{x}=(x_1, \ldots, x_{|v|})$, where $V=\{w_1, \ldots, w_{|v|}\}$ is the set of all terms (i.e., subordinate keywords) and $x_i$ is the weight of term $w_i$. When the user enters a series of keywords, the query vector $\vec{q}=(x_1, x_2, \ldots, x_m)$ is formed, where m is the number of keywords entered. Before any other action is taken, the user's information need is modeled through the term vector $\vec{x}=\vec{q}$. The original ranking of documents is then produced, by the underlying search engine At a certain period of time, consider that the user has viewed k documents whose summaries are $s_1, \ldots, s_k$. The user model $\vec{x}$ is then expanded by computing the user's updated information need. In one embodiment, each clicked summary $s_i$ is represented by a term weight vector $\vec{s}_i$ with each term weighted by a term frequency—inverse document frequency (TF-IDF) weighting formula, commonly used in IR. The system then computes the centroid vector of all the summaries and interpolates it with the original query vector to obtain the updated term vector. Where $\alpha$ is a parameter that controls the influence of the clicked summaries on the inferred information need model, the updated user model is as follows:

$$\vec{x} = \alpha \vec{q} + (1-\alpha) \frac{1}{k} \sum_{i=1}^{k} \vec{s}_i$$

In another embodiment, the system considers not only the clicked summaries, but also the ones that are skipped. When a user is presented with a list of summaries of top ranked documents, if the user chooses to skip the first n documents to view the (n+1)-th document, the system infers that the user is less interested in the first n documents, but is attracted by the (n+1)-th document. The system will thus use these summaries as negative and positive examples to update the user information need vector $\vec{x}$.

In one embodiment, every time the user model is updated the system re-ranks all of the documents in the result set by scoring each summary based on its similarity to the current user information need vector $\vec{x}$. In another embodiment, as mentioned previously, the system only re-ranks the documents that have yet to be seen. Then the highest ranked results of the unseen documents are moved forward and presented as "recommendations" for the user.

Figure 2E:
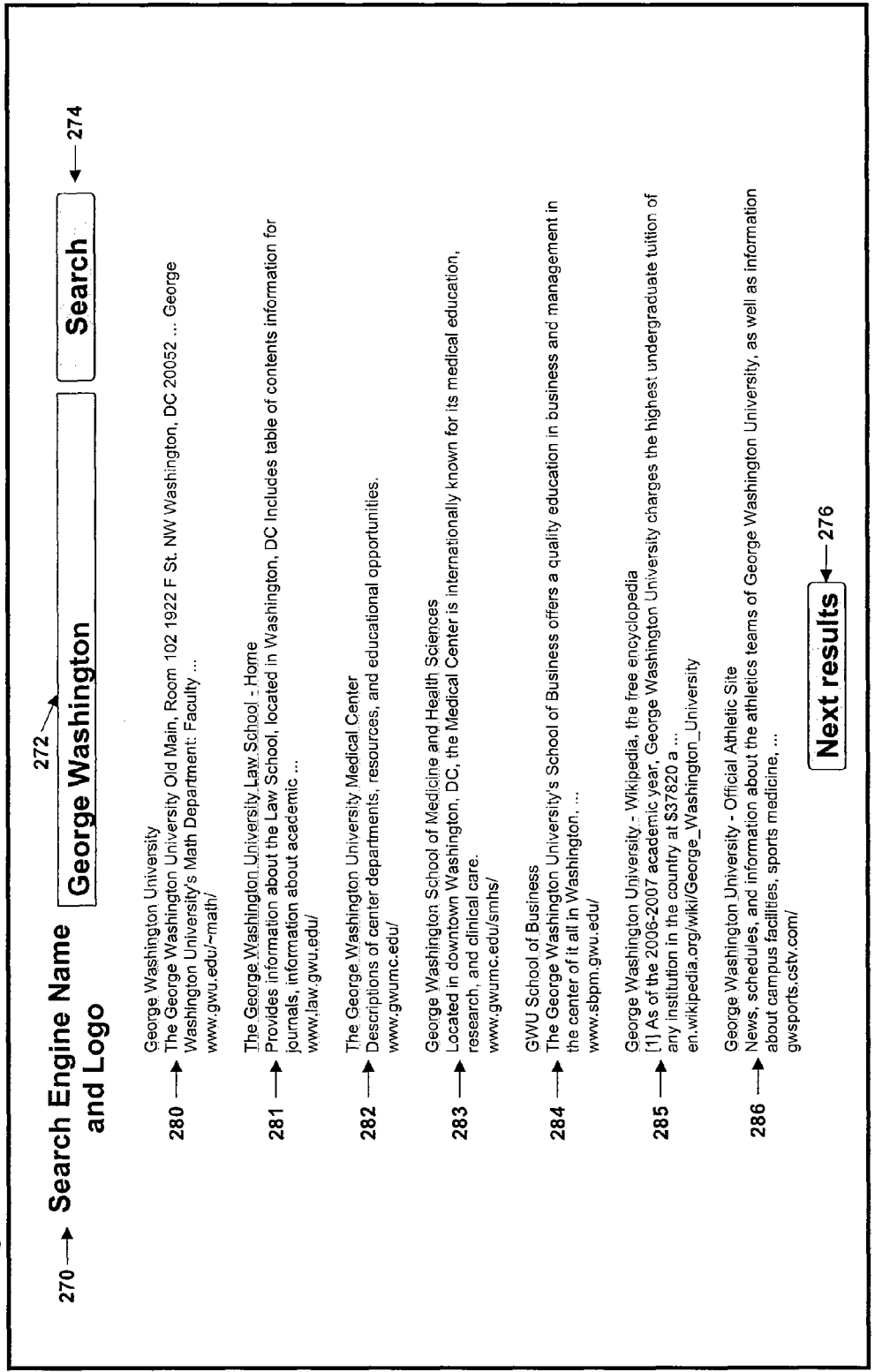
FIG. 2E is a diagram of one embodiment of the search results employing query expansion.

FIG. 2E is a diagram of an example of how the results from a subsequent query might look if the query was modified based on a determination that they belonged to the same information session. After executing the query in FIG. 2A through FIG. 2D, should the user modify the query string 272 from "Washington" to "George Washington," a careful analysis of the similarities between this query and the previous one would indicate that they belong to the same information session. As such, the system, in the background, will expand the query to "George Washington University" which is reflected in the result set 280-286. In this embodiment of the system the user is unaware of the query expansion. However, this would not necessarily have to be the case in other embodiments.

Information session boundary decisions involve determining whether two or more queries are related by examining the textual similarities between their results. Because related queries do not necessarily share the same keywords (e.g., "java island" and "travel Indonesia"), it is insufficient to consider only the keyword text. Therefore, in one embodiment the system compares the result sets of two or more queries and considers them to be in the same information session should their similarity exceed a predefined threshold.

Let $\{s_1, s_2, \ldots, s_n\}$ and $\{s'_1, s'_2, \ldots, s'_n\}$ be the result sets of two queries. In one embodiment the system uses the pivoted normalization TF-IDF weighting formula to compute a term weight vector $\vec{s}_i$ for each result $\vec{s}_i$. If $\vec{s}_{avg}$ is the centroid of all the result vectors, i.e., $(\vec{s}_1 + \vec{s}_2 + \ldots + \vec{s}_n)/n$, then the cosine similarity between the two result sets is the following:

$$\frac{\vec{S}_{avg} \cdot \vec{S}'_{avg}}{\sqrt{\vec{S}^2_{avg} \cdot \vec{S}'^2_{avg}}}$$

If a previous query and the current query are found to belong to the same information search session, in one embodiment the system would attempt to expand the current query with terms from the previous query and its search results. Specifically, for each term in the previous query or the corresponding search results, if its frequency in the results of the current query is greater than a preset threshold (e.g., 5 results out of 50), the term would be added to the current query to form an expanded query. In this case, the system would send this expanded query rather than the original one to the search engine and return the results corresponding to the expanded query. Furthermore, in one embodiment of the system, the initial results from a query deemed to be in the same information session as a previous query can be immediately re-ranked based on the user model from the previous query.

FIG. 3 is a flowchart of one embodiment of the invention. The user's experience begins on the invention's home page 300 as depicted in FIG. 2A. After entering a query, expressed as a keyword or set of keywords, the system examines the correlation with previous queries to determine if the current query belong in the same information session boundary 314. If so, the query may be modified 301 with one or more additional keywords. The system then produces an initial set of search results 302 as depicted in FIG. 2B. These results can be supplied by any third-party search engine, or internally should the system comprise its own search engine.

Once the initial search results are presented, the system begins collecting information regarding the user's behavior in an effort to divine the user's intent and interests before adjusting the results accordingly. Data regarding user behavior immediately following the initial search comes from anything related to the activity of the user, including, but not limited to, clicks on various links, including advertisements, in the search results as well as subsequent clicks on links within documents, skipped links in the search results, dwell times, time spent looking at documents from specific domains, resources accessed, transactions conducted, purchases made, orders placed, sessions created, documents downloaded, cursors moved, pages scrolled or text, images or other information highlighted, or any combination thereof. In general, the more time spent looking and conducting activities at a particular website, the more relevant that website is to the user.

The process continues by the user taking some form of action 304 such as selecting a document or going to the next page of results. In the case of selecting a document, the user is taken to that document so that it can be reviewed. While the document is being reviewed, the system will simultaneously take information collected regarding the user's behavior to re-rank the initial search results 308. If the user finds the desired document 310 on the first try, then the search is satisfied and the process is completed. However, should the user return to the search results page to continue the search process, the new search results, having been re-ranked while the user was away, will be displayed 312 as depicted in FIG. 2C and FIG. 2D. The process then proceeds with the user performing different actions while the system continues to collect data regarding the user's behavior in order to model the user's intent and then appropriately re-rank the search results. Each time the user returns to the search results page, the matched documents will have been re-ranked based on new intelligence gleaned from the user's behavior.

One mechanism for expressing the deduced intent of the user is through the use of "subordinate" keywords. Users typically execute queries with search engines by submitting a set of "primary" keywords. These primary keywords are matched by the search engines with their sets of indexed documents to produce lists of results which are then prioritized using any number of different relevancy algorithms. The matched documents produced, however, must, in one way or another, contain all of the primary keywords submitted for the query. In other words, the primary keywords are "all or nothing;" those documents that do not include the complete set of primary keywords are excluded. (Some search engines apply some "fuzziness" to this rule with word stemming and other techniques, and contextualized search engines apply even more "fuzziness" as they attempt to match concepts as opposed to terms, but the basic principal remains.) Subordinate keywords, on the other hand, are keywords that are identified as important but are not necessarily essential to the query. They enable the system to give preferential treatment to (i.e. increase the relevancy of) documents that contain a subset of those keywords without necessarily eliminating those that do not.

While many search engines offer "advanced" search functionality that enables users to specify, for example, keywords that are not to appear or a set of keywords where at least one must be present, these techniques are complex and, even with a bit of manipulation, cannot be used to emulate the functionality or utility of subordinate keywords. Users who are sophisticated enough to avail themselves of the advanced search functionality commonly offered by search engines will still receive significant advantages from the present invention.

FIG. 4 is a flowchart of one embodiment of the process of generating subordinate keywords and re-ranking search results. As mentioned previously, when the user takes some sort of action 400 such as selecting a document or continuing to another page of results, the system generates subordinate keywords which are then added to the list of any that might already exist (step 402). Based on where the subordinate keywords appear and with what frequency, the system then assigns weights to, or adjusts the weights of, each subordinate keyword (step 404). These subordinate keywords, with their associated weights, are then used to adjust the relevancies of the documents in the search results (step 406). The new relevancies will be a function of the old relevancies in addition to a function of the weights, frequencies and locations of appearances of the subordinate keywords in each of the matched documents. The new relevancies are then used to dynamically re-rank the documents in the search results (step 408) with the effect of moving the most relevant documents up while pushing the least relevant down.

Subordinate keywords are automatically generated by the system from a variety of places, including, but not limited to, links clicked on by the user, other links associated with the document such as links pointing to the document, "descriptive text" associated with each document in the search results, meta-tags connected to viewed documents, and prominent words and phrases in viewed documents. (As is common practice with search engines, "stop words," defined as those words which are so common that they are useless to index, are ignored.)

A thesaurus can also be used to generate similar words and phrases that might be of interest to the user. Since subordinate keywords are simply an expression of important ideas, and do not as such eliminate any matched documents from the results of a query, they can be employed with abundance. In fact, the more subordinate keywords are generated from the user's behavior, the more likely the system is to find the most relevant documents and move them to the top of the search results.

For example, one embodiment of the system might generate subordinate keywords from every word in the title and display text of any document selected by virtue of a user's click. In FIG. 2B the title and display text for document 226 are, respectively, "George Washington University" and "The George Washington University is located four blocks from the White House and was created by an Act of Congress in 1821." Therefore, if N represents the number of subordinate keywords generated, $sk_n$ represents the $n^{th}$ subordinate keyword and $s_n$ represents the number of times that the $n^{th}$ subordinate keyword appears in the title and display text of the selected document, then TABLE I is a demonstration of the subordinate keywords generated from clicking on document 226:

TABLE I

| n | $sk_n$ | $s_n$ |
| --- | --- | --- |
| 1 | george | 2 |
| 2 | university | 2 |
| 3 | located | 1 |
| 4 | four | 1 |
| 5 | blocks | 1 |
| 6 | white | 1 |
| 7 | house | 1 |
| 8 | created | 1 |
| 9 | act | 1 |
| 10 | congress | 1 |
| 11 | 1821 | 1 |

(It should be noted that "Washington" is not a subordinate keyword because it is a primary keyword 212.)

The next step is to assign "weights" to each subordinate keyword. Some subordinate keywords will undoubtedly be more important than others and assigning weights will enable the system to more accurately express the deduced intent of the user. The weight of each subordinate keyword is determined based on a number of factors, including, but not limited to, the placements of the keyword and frequencies with which it appears in the links, descriptive text, meta-tags or any other information associated with documents referred to by the user, including the documents themselves.

Depending upon the behavior of the user, subordinate keywords can even be deemed to have negative weights, meaning that they represent ideas in which the user is not interested. In one embodiment of the system, negative keywords are generated from the titles and display texts of documents that are passed over by the user. For example, if the user were to click on the fourth document in a list of results, it can be inferred from the user's behavior that there is little or no interest in the information presented in the first three results. As such, any subordinate keywords present in the titles and display texts of the first three documents can be given a negative weight.

In one embodiment, subordinate keyword weights are further adjusted by soliciting feedback from the user with respect to each document viewed. By requesting that the user indicate, on a scale, for example, the usefulness of a document just viewed, the system can adjust the extent to which the weights of the subordinate keywords associated with that document are raised or lowered. In the absence of such explicit feedback, other information regarding the user's behavior, such as dwell time and any sort of activity, can be used to infer to what extent viewed documents are interesting to the user.

In any event, the weight of a given subordinate keyword will be a function that takes into account the locations and frequencies of its appearances. Subordinate keywords that appear in some places, such as titles or display texts, may be given more weight than if they had appeared elsewhere, such as buried in selected documents. Furthermore, subordinate keywords that appear in important documents may be given more weight than if they had appeared in less important documents.

If $l_n$ represents the weight of the $n^{th}$ subordinate keyword and $a_n$ through $z_n$, and possibly beyond, represent the frequency with which $sk_n$ appears in various places in specific documents, such as titles, descriptive texts, links, meta-tags and so forth, then the following represents a generalized formula for calculating subordinate keyword weights:

$$l_n = f_1(a_n) + f_2(b_n) + f_3(c_n) + \ldots$$

One embodiment of the system might make the weight of a subordinate keyword a function of the number of times it appears in the titles or display texts of documents that have been selected by virtue of a user click. As such, the following formula, using the arctangent function to provide a mechanism for having the weights asymptotically approach a given value as the frequency of appearances increases, could be used to generate weights in the range of −100 to +100:

$$l_n = (200/\pi)\tan^{-1}(s_n/3)$$

(The purpose of asymptotically approaching a given value is to steadily decrease the impact of the marginal appearance so that no one keyword overwhelms the others.)

Using the data from TABLE I, TABLE II indicates the weights that would be associated with each subordinate keyword by employing the formula above:

TABLE II

| n | $sk_n$ | $s_n$ | $l_n$ |
|---|--------|-------|-------|
| 1 | george | 2 | 37 |
| 2 | university | 2 | 37 |
| 3 | located | 1 | 20 |
| 4 | four | 1 | 20 |

TABLE II-continued

| n | $sk_n$ | $s_n$ | $l_n$ |
|---|--------|-------|-------|
| 5 | blocks | 1 | 20 |
| 6 | white | 1 | 20 |
| 7 | house | 1 | 20 |
| 8 | created | 1 | 20 |
| 9 | act | 1 | 20 |
| 10 | congress | 1 | 20 |
| 11 | 1821 | 1 | 20 |

Once the subordinate keywords have been generated and each assigned with an appropriate weight, the data is utilized to re-rank the matched documents in the search results. Documents are increased (or decreased) in importance and moved up (or down) in the prioritization of the search results based on their association with the subordinate keywords. With the goal of dynamically re-ranking the search results to best reflect the deduced intent of the user, a ranking algorithm must be developed and then tuned to specify the impact that each subordinate keyword has on the movement of the documents in the search results.

The ranking function will run through the search results and adjust the rank of each matched document based on which subordinate keywords are associated with each document, taking into account the weights of each as well as where exactly they are found. The ranking function will, naturally, also take into account the previous rank of the document, helping to reflect, in some way, the intelligence that went into producing the initial order of the search results. Much as the weights of the subordinate keywords were based on where and how often those keywords appeared in relation to the selected, or skipped, documents, the movement of matched documents in the search results will similarly depend on where the subordinate keywords appear. A document with a large number of high-weight subordinate keywords in its title, display text and meta-tags will perhaps move much more dramatically than a document with a few low-weight subordinate keywords buried deep within the text of the document. It should also be noted that the presence of subordinate keywords with positive weights will increase the relevancy of the document, moving it up in the rankings, while the presence of subordinate keywords with negative weights will decrease the relevancy and have the opposite effect.

Thus, if M represents the number of matched documents returned by a given query, $r_m$ represents the rank of the $m^{th}$ document and $a_{m,n}$, $b_{m,n}$, etc. represent the frequency with which the $n^{th}$ subordinate keyword appears in a particular place with respect to the $m^{th}$ document, such as the title or display text, then the generalized ranking function will look as follows:

$$R(m) = f_R(r_m) + \sum_{n=1}^{N} f_{R1}(a_{m,n}, l_n) + f_{R2}(b_{m,n}, l_n) + f_{R3}(c_{m,n}, l_n) + \ldots$$

Since the actual relevancy scores as determined by the underlying search engine are not necessarily available, the ranks of the matched documents serve as proxies for relevancy. However, if the underlying search engine were to share the computed relevancy scores of the matched documents, via some method of communication such as an API, or if the invention was actually incorporated into the underlying search engine itself, then those relevancy scores could be used for $r_m$, in place of the rank, potentially increasing the effectiveness of the system.

To illustrate, if $t_m$ and $d_m$ represent, respectively, the title and display text of the $m^{th}$ document, then TABLE IV is a depiction of the first eight search results as demonstrated in FIG. 2B:

TABLE IV

| m | $r_m$ | $t_m$ | $d_m$ |
|---|---|---|---|
| 1 | 1 | Access Washington Home Page | Locate Washington State Government information and services available on the Web. |
| 2 | 2 | University of Washington | Offers information and news for prospective and current students, faculty, and staff. Highlights . . . |
| 3 | 3 | Experience Washington | The official website of Washington State Tourism with maps, history, and tourist attractions. |
| 4 | 4 | Washington DC Convention and Visitors Association | Official visitor information for Washington, DC - the Nation's Capital, WCTC Home. |
| 5 | 5 | Washington Post | Daily. Offers news, opinion, sports, arts and living and entertainment. Includes archives since 1977 . . . |
| 6 | 6 | Washington News - New York Times | Find breaking news, multimedia & opinion from Washington including news on politics, the election, the President, Supreme Court, Congress and The White . . . |
| 7 | 7 | George Washington University | The George Washington University is located four blocks from the White House and was created by an Act of Congress in 1821. |
| 8 | 8 | NBA.com: Washington Wizards | Official site containing news, scores, audio and video files, player statistics and schedules. |

One embodiment of the system might use a ranking function that makes the new rank of a document equal to its previous rank plus some function of the subordinate keywords that appear in the document's title and display text. Where $W_r$ and $W_s$ represent constant weights and Er and Es represent constant exponents, such a ranking function, using the sgn( ) and absolute value functions to handle negative subordinate keyword weights, could be displayed as follows:

$$R(m) = W_r r_m^{Er} + \sum_{n=1}^{N} (\text{number of occurrences of } sk_n \text{ in } t_m \text{ and } d_m) \, W_s sgn(l_n) |l_n|^{Es}$$

The values of the constants in the ranking function will be developed by careful analysis of empirical user data. The objective is to determine these values in order to optimize the movement of documents and minimize the amount of searching required by the user to find the desired information. One embodiment of the invention uses empirical user data as it is collected to refine the values of the constants in real time. By identifying the end of a successful search, possibly but not necessarily with the help of feedback from the user, the system could, over time, adjust the values of the constants in order to maximize the percentage of searches that end successfully while minimizing the time required to successfully complete a search. In one embodiment the constants are actually customized for each user, representing how different users behave differently, and stored in a user profile or cookie. In another embodiment, the constants also depend on other information such as the number of matched documents, which underlying search engine is being used, the language of the results, the country where the user is located, or virtually any other variable.

To illustrate how the ranking function works, when the subordinate keywords in TABLE II are applied to the search result documents in TABLE IV, while setting $W_r$, Er and Es to 1 and $W_s$ to −½, the new rankings, R(m), are produced as displayed in TABLE V:

TABLE V

| m | $r_m$ | R(m) | $t_m$ | $d_m$ |
|---|---|---|---|---|
| 1 | 1 | −9 | Access Washington Home Page | Locate Washington State Government information and services available on the Web. |
| 2 | 2 | −16½ | University of Washington | Offers information and news for prospective and current students, faculty, and staff. Highlights . . . |
| 3 | 3 | 3 | Experience Washington | The official website of Washington State Tourism with maps, history, and tourist attractions. |
| 4 | 4 | 4 | Washington DC Convention and Visitors Association | Official visitor information for Washington, DC - the Nation's Capital, WCTC Home. |
| 5 | 5 | 5 | Washington Post | Daily. Offers news, opinion, sports, arts and living and entertainment. Includes archives since 1977 . . . |
| 6 | 6 | −14 | Washington News - New York Times | Find breaking news, multimedia & opinion from Washington including news on politics, the election, the President, Supreme Court, Congress and The White . . . |

TABLE V-continued

| m | $r_m$ | R(m) | $t_m$ | $d_m$ |
|---|---|---|---|---|
| 7 | 7 | −157 | George Washington University | The George Washington University is located four blocks from the White House and was created by an Act of Congress in 1821. |
| 8 | 8 | 8 | NBA.com: Washington Wizards | Official site containing news, scores, audio and video files, player statistics and schedules. |

Using the first document (m=1) as an example, the only subordinate keyword from TABLE II found in either the title, $t_1$, or display text, $d_1$, is "locate." (Techniques, such as stemming, should be employed to, where appropriate, enable the broad matching of terms so that, for example, "located"="locate." Artificial intelligence and contextualized matching can also be used to further enhance the term-matching ability of the system.) Since the weight of the subordinate keyword is 20, the ranking equation is thus $1+1\times-\frac{1}{2}\times20=-9$. Using the second document (m=2) as another example, the only subordinate keyword from TABLE II found in either the title, $t_2$, or display text, $d_2$, is "university," which has a weight of 37. The ranking equation is thus $2+1\times-\frac{1}{2}\times37=-16\frac{1}{2}$. Finally, the seventh document (m=7) represents a more complicated example. The two words "george" and "university," with weights of 37, both appear twice in the title, $t_7$, and display text, $d_7$. The nine words "located," "four," "blocks," "white," "house," "created," "act," "congress," and "1821" all appear once in the display text, $d_7$, and have weights of 20. The ranking function is thus $7+(2\times-\frac{1}{2}\times37)\times2+(1\times-\frac{1}{2}\times20)\times9=-157$.

When sorted by R(m), and then resetting the values of $r_m$ for the new rankings, the documents are rearranged as shown in TABLE VI:

TABLE VI

| m | $r_m$ | R(m) | $t_m$ | $d_m$ |
|---|---|---|---|---|
| 1 | −157 | −157 | George Washington University | The George Washington University is located four blocks from the White House and was created by an Act of Congress in 1821. |
| 2 | −16½ | −16½ | University of Washington | Offers information and news for prospective and current students, faculty, and staff. Highlights . . . |
| 3 | −14 | −14 | Washington News - New York Times | Find breaking news, multimedia & opinion from Washington including news on politics, the election, the President, Supreme Court, Congress and The White . . . |
| 4 | −9 | −9 | Access Washington Home Page | Locate Washington State Government information and services available on the Web. |
| 5 | 3 | 3 | Experience Washington | The official website of Washington State Tourism with maps, history, and tourist attractions. |
| 6 | 4 | 4 | Washington DC Convention and Visitors Association | Official visitor information for Washington, DC - the Nation's Capital, WCTC Home. |
| 7 | 5 | 5 | Washington Post | Daily. Offers news, opinion, sports, arts and living and entertainment. Includes archives since 1977 . . . |
| 8 | 8 | 8 | NBA.com: Washington Wizards | Official site containing news, scores, audio and video files, player statistics and schedules. |

Some of the new rankings are obviously negative. This does not present a problem, however, since the matched documents are simply ordered from the lowest ranking to the highest. It should also be noted that the calculations in TABLES V and VI will have to be executed on all of the results as opposed to just the first eight, or even just those on the first page of the search results, as it is likely that documents from subsequent pages will be moved forward while others dropped back.

As a practical matter, computational limitations imposed by the server hosting the invention software might prohibit running the ranking algorithm on all of the matched documents generated by a query, especially if there are millions of them. Not only is processor speed required to execute all of the calculations, but the server memory might need to be large enough to hold all of the results. Fortunately, the ranking algorithm can be run on a fairly large number of matched documents, the first several hundred or thousand for example, without significantly impacting the effectiveness of the system. Should a determined user page through a large proportion of those re-ranked documents, the system can simply grab the next batch of several hundred or thousand and quickly re-rank those with the previous batch. In any event, it is important to run as many computations as possible in the background while the user is reading or reviewing documents in order to avoid imposing delays on the user.

Should the ranking function take into account the presence of subordinate keywords in the actual documents, this could additionally require a significant amount of bandwidth and processing power as each document is downloaded and reviewed. A computational and time-saving technique, however, would be to use the power of the underlying search engine, or even another search engine, to accelerate the speed with which subordinate keywords are identified in matched documents. Rather than scanning all of the matched documents for the presence of subordinate keywords, the system can, in the background, run queries using the subordinate keywords, or just the most important thereof to save on computational time, in order to quickly determine which of the matched documents contain the recently generated subordinate keywords. At this point all that is required is a simple corresponding of the initial matched documents with the results generated by the subordinate keyword queries. The ranking function can then quickly take into account the presence of subordinate keywords in the matched documents themselves and adjust the rankings accordingly.

In one embodiment of the invention, the subordinate keywords are displayed to the user. The subordinate keywords can be shown in color, with blue representing positive subordinate keywords and red representing negative subordinate keywords. While the actual color is not important, the intensity of the color corresponds with the weight: the more intense the color, the more the weight is either positive or negative. The subordinate keywords would thus be listed from dark blue (very positive) to dark red (very negative).

This can be beneficial for a couple of reasons: not only does this give insight into how the system is operating, but users can then assist the system in locating relevant documents by either manually removing or promoting specific subordinate keywords. Should the user know that a particular subordinate keyword is not relevant to the query, that keyword can be selected and then removed. Should the user see a subordinate keyword that is deemed more than just important, but essential, to the query, it can be selected and then promoted to a primary keyword.

Additionally, since this system is a novel approach to assisting the user to find relevant documents, the movement of the matched documents might initially be confusing. To help ease the transition. "Movement indicators" can be placed immediately to the left of documents to indicate how the documents have moved since the last visit to the search results page (+6, −9, +13, etc.).

The outcome is thus a real time implicit personalization search engine that continuously changes, updates and reorganizes search results based upon the intent of the user as deduced from the ongoing behavior of the user during the search process. As the user clicks on links, views documents, executes transactions, downloads files, scrolls pages, executes other queries, or performs almost any kind of activity, the system takes this information and updates the user model before then reprioritizing the search results "on the fly." The end result is a search engine better able to assist users in finding desired documents and information.

In one embodiment, user behavior monitoring is done by a first software module on server 132 in FIG. 1. The behavior information is provided to a second, re-ranking software module on server 132. The re-ranking module modifies the rankings of search results received from a third-party search engine and stores the re-ranked results on database 130. The re-ranking software module also performs the highlighting, indication of document movement, and other functions not performed by the monitoring software module or the third-party search engine. The re-ranked search results are supplied to a client browser on the user's computer. The client browser software may perform some of the customized display functions of the invention.

The user browser may be installed on other devices than a computer, such as a personal digital assistant (PDA), a mobile phone, or any other device. The display can be modified to fit a smaller form factor.

As will be understood by those of skill in the art, the present invention could be embodied in other specific forms without departing from the essential characteristics thereof. For example, in addition to expanding the user model based on that individual's behavior, data based on other prior users' experiences and click streams could be used to re-rank the results in real time. This could provide two levels of ranking, (1) a first re-ranking using the user model as described above, and (2) a second re-ranking using the webpages found most desirable by previous users doing similar searches.

The present invention can use a separate third party search engine, or could be integrated with a search engine. The search engine could be a general search engine that searches the internet, a specialized search engine that searches a particular web site, a database search engine, a meta-search engine that combines the results of multiple other search engines, or any other type of search engine. Accordingly the foregoing description is intended to be illustrative, but not limiting, of the scope of the invention which is set forth in the following claims.

What is claimed is:

1. A method for dynamically modifying search results comprising:
   receiving one or more keywords for use as search terms from a user;
   providing a set of search result objects on a first page of results displayed to said user;
   providing title and display text with each of said search result objects in said set of search result objects;
   monitoring which of said objects is selected by said user;
   compiling information to infer user intent based on the content of said document the user clicks; and
   by the time said user returns from said document to said set of search result objects including said document, immediately automatically re-ranking said set of search result objects based on user intent inferred from said analyzing of the content of said document said user clicks on, so that a user clicking on a single document from said set of search result objects results in a re-ranking of said set of search result objects, so that upon said user returning from said document to said set of search result objects including said document, without the user resubmitting the search, the re-ranked results will be visible;
   using terms from the title and display text corresponding to a selected object in an algorithm for generating said re-ranking of said set of search result objects on at least said first page;
   wherein said re-ranking includes moving at least one object from a subsequent page, not originally visible to said user on said first page, onto said first page;
   wherein said at least one object moved onto said first page is displayed in a manner to indicate to the user that it has been inserted between other objects on said first page, with said display providing an indication that the object is from a subsequent page and was not originally displayed on said first page.

2. The method of claim 1 further comprising:
   using terms from the title and display text corresponding to a selected object as subordinate keywords for generating said re-ranking of said set of search result objects.

3. The method of claim 2 further comprising:
   selecting subordinate keywords from at least one of the links clicked on by the user, other links associated with a document including links pointing to the document, descriptive text associated with each document in the search results, meta-tags connected to viewed documents, prominent words and phrases in viewed documents and a thesaurus.

4. The method of claim 2 further comprising:
   using terms from the title and display text corresponding to objects skipped by a user as negative subordinate keywords; and
   reducing the ranking of search results objects containing said negative subordinate keywords.

5. The method of claim 2 further comprising:
assigning weights to said subordinate keywords, such that search result objects having higher weighted subordinate keywords are ranked higher.

6. The method of claim 2 further comprising:
providing a user interface allowing a user to promote selected subordinate keywords such that they have a higher weighting or are used as primary keywords to generate new search results.

7. The method of claim 2 further comprising:
providing a user interface allowing a user to delete selected subordinate keywords.

8. The method of claim 1 wherein said providing a set of search result objects is performed by a separate search engine software program from a user behavior program that performs said monitoring and generating steps.

9. The method of claim 1 further comprising monitoring user behavior by at least one of:
subsequent clicks on links within documents;
dwelling times;
time spent looking at documents from specific domains;
resources accessed;
transactions conducted;
purchases made;
orders placed;
sessions created;
documents downloaded;
cursors moved;
pages or text scrolled; and
images or other information highlighted.

10. The method of claim 1 further comprising:
rating the usefulness of at least one of said search result objects in response to a user rating input.

11. The method of claim 1 further comprising:
providing a display indication of the ranking movement of said search result objects in said re-ranking of said set of search result objects.

12. The method of claim 1 wherein said one or more keywords are a first query, and further comprising:
receiving a second query of one or more keywords from said user:
generating a second set of search result objects;
comparing said second set of search result objects to one of said set of search result objects and said re-ranked set of search result objects to determine a correlation; and
providing a modified second set of search result objects to said user based on said correlation.

13. The method of claim 12 wherein said correlation comprises a similarity between keywords in said first and second queries.

14. The method of claim 12 wherein said correlation comprises a similarity between said sets of search result objects.

15. The method of claim 12 wherein said correlation comprises a similarity in text in said search result objects.

16. The method of claim 12 wherein said modified second set of search result objects is produced using keywords or other important terms from both said first and second queries.

17. The method of claim 1 wherein user behavior data is created by said monitoring step and is stored only on said user's computer.

18. The method of claim 1 further comprising:
cumulatively using analysis of user intent to re-rank said set of search result objects based on subsequent documents said user clicks on and skips.

19. The method of claim 1 further comprising:
re-ranking only search results of said set of search result objects on search result pages the user has not yet navigated to.

20. The method of claim 19 further comprising displaying at least one search result on search result pages the user has not yet navigated to as a recommendation on a current page of search results.

21. A system for dynamically modifying search results comprising:
a user interface on a first computer configured to receive one or more keywords for use as search terms from a user;
a search engine on a server in communication with said first computer over a network, said search engine being configured to provide a set of search result objects on a first page of results displayed in response to said keywords and to provide title and display text with each of said search result objects in said set of search result objects and to provide a plurality of advertisements on said first page of results;
a monitoring program in communication with said network, said monitoring program being configured to monitor user behavior in interacting with said search result objects;
a re-ranking program configured to monitor which document said user clicks on in interacting with said first set of search result objects;
compile information to infer user intent based on the content of said document the user clicks on;
by the time said user returns from said document to said set of search result objects including said document, immediately automatically re-rank said set of search result objects based on user intent inferred from said analyzing of the content of said document said user clicks on, so that a user clicking on a single document from said set of search result objects results in a re-ranking of said set of search result objects, so that upon said user returning from said document to said set of search result objects including said document, without the user resubmitting the search, the re-ranked results will be visible; and
use terms from the title and display text corresponding to a selected object in an algorithm for generating said re-ranking of said set of search result objects on at least said first page;
wherein said re-ranking includes moving at least one object from a subsequent page, not originally visible to said user on said first page, onto said first page;
wherein said at least one object moved onto said first page is displayed in a manner to indicate to the user that it has been inserted between other objects on said first page, with said display providing an indication that the object is from a subsequent page and was not originally displayed on said first page.

22. The system of claim 21 wherein said search engine is on a first server, and said monitoring and re-ranking programs are on a second server.

23. A non-transitory computer readable media having computer readable code thereon for dynamically modifying search results, comprising code for:
receiving one or more keywords for use as search terms from a user;
providing a set of search result objects on a first page of results displayed to said user;
providing title and display text with each of said search result objects in said set of search result objects;
monitoring which of said objects is selected by said user;
compiling information to infer user intent based on the content of said document the user clicks; and
by the time said user returns from said document to said set of search result objects including said document, immediately automatically re-ranking said set of search result objects based on user intent inferred from said analyzing of the content of said document said user clicks on, so that a user clicking on a single document from said set of search result objects results in a re-ranking of said set of search result objects, so that upon said user returning from said document to said set of search result objects including said document, without the user resubmitting the search, the re-ranked results will be visible;

using terms from the title and display text corresponding to a selected object in an algorithm for generating said re-ranking of said set of search result objects on at least said first page;

wherein said re-ranking includes moving at least one object from a subsequent page, not originally visible to said user on said first page, onto said first page;

wherein said at least one object moved onto said first page is displayed in a manner to indicate to the user that it has been inserted between other objects on said first page, with said display providing an indication that the object is from a subsequent page and was not originally displayed on said first page.

24. A device having a processor which will perform the steps of:

receiving one or more keywords for use as search terms from a user;

providing a set of search result objects on a first page of results displayed to said user;

providing title and display text with each of said search result objects in said set of search result objects;

monitoring which of said objects is selected by said user;

compiling information to infer user intent based on the content of said document the user clicks; and by the time said user returns from said document to said set of search result objects including said document, immediately automatically re-ranking said set of search result objects based on user intent inferred from said analyzing of the content of said document said user clicks on, so that a user clicking on a single document from said set of search result objects results in a re-ranking of said set of search result objects, so that upon said user returning from said document to said set of search result objects including said document, without the user resubmitting the search, the re-ranked results will be visible;

using terms from the title and display text corresponding to a selected object in an algorithm for generating said re-ranking of said set of search result objects on at least said first page;

wherein said re-ranking includes moving at least one object from a subsequent page, not originally visible to said user on said first page, onto said first page;

wherein said at least one object moved onto said first page is displayed in a manner to indicate to the user that it has been inserted between other objects on said first page, with said display providing an indication that the object is from a subsequent page and was not originally displayed on said first page.

* * * * *